E. M. SMITH.
Feeder for Carburetors.
No. 59,142.
Patented Oct. 23, 1866.
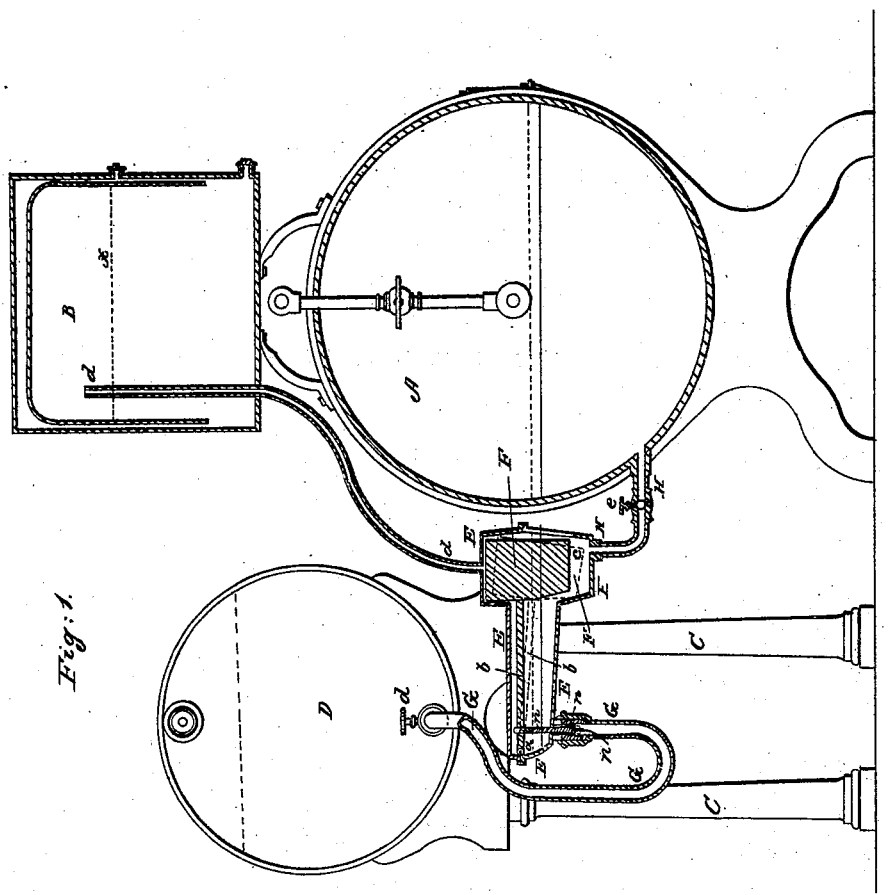
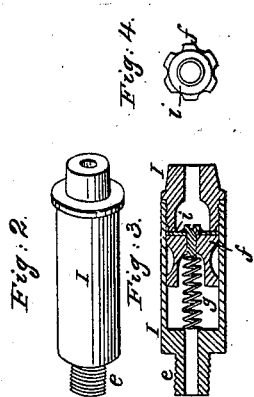
Witnesses:
Inventor:

UNITED STATES PATENT OFFICE.

EDGAR M. SMITH, OF NEW YORK, N. Y., ASSIGNOR TO MITCHELL, VANCE & CO., OF SAME PLACE.

IMPROVED FEEDER FOR CARBURETERS.

Specification forming part of Letters Patent No. 59,142, dated October 23, 1866.

*To all whom it may concern:*

Be it known that I, EDGAR M. SMITH, of the city, county, and State of New York, have invented a new and useful Improvement in an Automatic Feeder for Gas Apparatus; and I do hereby declare the following to be a full, clear, and exact description of the same, reference being had to the accompanying drawings, making a part of this specification, in which—

Figure 1 represents a vertical section taken through the apparatus to show its operation. Figs. 2, 3, and 4 represent a self-acting vent, to be applied to the barrel of gasoline or other gas-making material to cause it to act regularly.

My invention is designed for supplying a gas-machine automatically with gasoline or other gas-making material in a liquid state, and thus relieve the user or attendant from all care of supplying the machine with the gas material; and my invention consists, mainly, in interposing between the barrel or cask containing the gasoline or other material used for the purpose and the gas apparatus or machine, and connected with both by suitable pipes, (and stop-cocks, if desirable,) a caged float and valve, so as to open and let on or to close and shut off the supply as soon as the gasoline or other material falls below or rises in the machine to its proper level.

To enable others skilled in the art to make and use my invention, I will proceed to describe the same with reference to the drawings.

A may represent the gas apparatus, and B the gasometer, made and connected in any of the usual well-known ways, so as to force atmospheric air into, under, or through the gasoline or other material to impregnate it with said material, and cause it in burning to give a bright light for illuminating purposes.

For supplying the apparatus regularly and automatically with the gas-making material, a suitable stand, C, is made for holding a barrel or cask, D, of any kind, or such as the material is sent to market in. On this stand, or any other to give it a firm support and a suitable height and proper level, is placed a tight cage or case, E, in which is pivoted, as at $a$, a lever, $b$, having upon its free end a float or buoy, F, which can rise and fall in an expanded chamber, $c$, in said cage or case. To one end of the cage or case E is attached a pipe, G, which leads to and is connected with the barrel or cask D, and to the opposite end of the cage or case another pipe, H, is connected, leading to the gas apparatus A. These pipes I prefer to attach to the under portions respectively of the barrel, cage, and gas apparatus, as seen in the drawings, and cocks $d\ e$ may be applied to shut off the flow of gas when for any purpose it becomes necessary to do so. From the top of the cage E a pipe, $d$, extends up into the gasometer B and above the water-line $x$ therein; or it may extend into the service-pipe, the object being to make a vent to the cage above the supply source in the barrel D, but at the same time not to allow the vapor of the gasoline or other material to escape in the apartment or house in which the apparatus is used.

I, Figs. 2, 3, and 4, represents in detail a self-acting vent for the barrel or cask D, the end $e$ whereof is screwed into the barrel. $f$ is a valve, controlled by a spring, $g$, and having an india-rubber or other packing, $i$, upon it. When by a vacuum in the barrel the atmospheric pressure upon the valve $f$ becomes great enough to overcome the spring $g$, which is a delicate one, just sufficient to hold the valve to its seat, the valve will open inward and allow the external air to fill the vacuum without allowing the vapor of its contents to escape; and the moment the air passes in the spring again closes the valve and shuts off any and all escape of the vapor of the gas-making material.

The action of the caged valve and buoy will be obvious from the drawings. The dotted line $y$ may represent the height at which it is desirable to keep the supply of gasoline or other similar gas-making material in the gas apparatus A. Should this quantity be lowered to the red line $z$, the float F, lever $b$, and valve $n$ would occupy the positions also shown in red lines, and thus open the communication between the supply-barrel D and the gas apparatus. When the material rises in the gas apparatus again to the line $y$ the float, lever, and valve will rise to the positions shown in dark lines and shut off the supply, and thus a uniform, regulated, automatic supply is had from the barrel to the gas apparatus. When the barrel or cask is empty the pipe G is detached, a fresh barrel or cask put upon the stand, the pipe again connected, and the communication opened.

Having thus fully described my invention, what I claim therein as new, and desire to secure by Letters Patent, is—

1. A cased or caged float and valve interposed between a supply barrel or cask and the gas apparatus or machine for the purpose of supplying automatically and in uniform quantities the gasoline or other gas-making material from the barrel to the apparatus, substantially as herein described.

2. The vent tube or pipe $d$, extending from the cage to the gasometer or service-pipe, as described.

EDGAR M. SMITH.

Witnesses:
  A. B. STOUGHTON,
  LEVI STEVENS.